United States Patent [19]
Hahn et al.

[11] 4,404,760
[45] Sep. 20, 1983

[54] EXCAVATING TOOTH

[75] Inventors: Frecerick C. Hahn, Aloha; William R. Barber, Jr., Portland, both of Oreg.; David A. Hampel, Vancouver, Wash.

[73] Assignee: Esco Corporation, Portland, Oreg.

[21] Appl. No.: 351,769

[22] Filed: Feb. 24, 1982

Related U.S. Application Data

[63] Continuation-in-part of Ser. No. 144,368, Apr. 28, 1980, abandoned, and a continuation-in-part of Ser. No. 235,771, Feb. 25, 1981, Pat. No. 4,335,532.

[51] Int. Cl.[3] .............................................. E02F 9/28
[52] U.S. Cl. .................................. 37/142 R; 403/317
[58] Field of Search ............ 37/142 R, 142 A, 141 R, 37/141 T; 403/315–319

[56] References Cited

U.S. PATENT DOCUMENTS

| | | | |
|---|---|---|---|
| 1,060,141 | 4/1913 | Snyder | 37/142 R |
| 1,697,536 | 1/1929 | Miley | 37/142 R |
| 2,167,425 | 7/1939 | Page | 37/142 R |
| 2,990,633 | 7/1961 | Van Buskian | 37/142 R |
| 3,117,386 | 1/1964 | Ferwerda | 37/142 R |
| 3,371,437 | 3/1968 | Wilson et al. | 37/142 R |
| 3,623,247 | 11/1971 | Stepe | 37/142 R |
| 4,050,172 | 9/1977 | Petersen | 37/142 A |
| 4,231,173 | 11/1980 | Davis | 37/142 R |

FOREIGN PATENT DOCUMENTS

| | | | |
|---|---|---|---|
| 1205070 | 9/1970 | Australia | 37/142 R |
| 2162474 | 6/1973 | Fed. Rep. of Germany | 37/142 R |
| 2841523 | 3/1980 | Fed. Rep. of Germany | 37/142 R |
| 1281192 | 11/1961 | France | 37/142 R |

*Primary Examiner*—E. H. Eickholt
*Attorney, Agent, or Firm*—Tilton, Fallon, Lungmus & Chestnut

[57] ABSTRACT

An excavating tooth wherein the coupling between the point and the adapter is achieved through an external lock to convert lateral point unseating forces from shear to compression.

18 Claims, 9 Drawing Figures

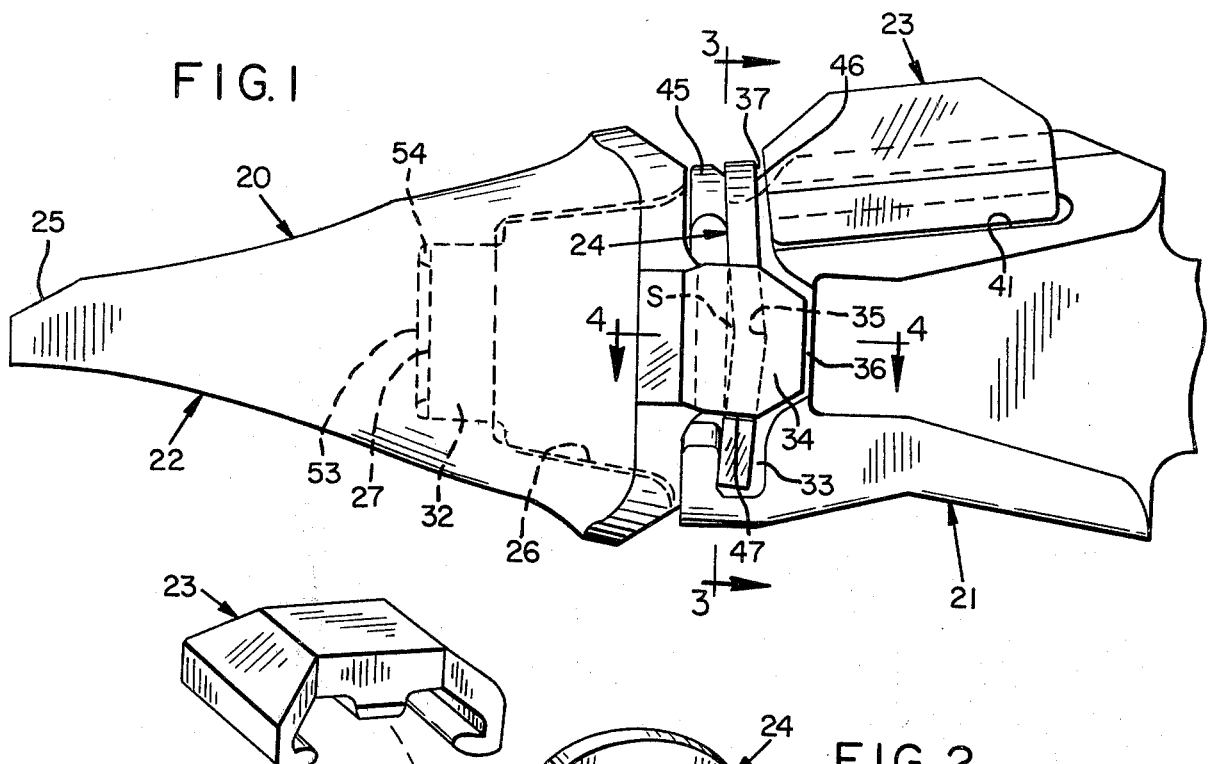
FIG. 1
FIG. 2
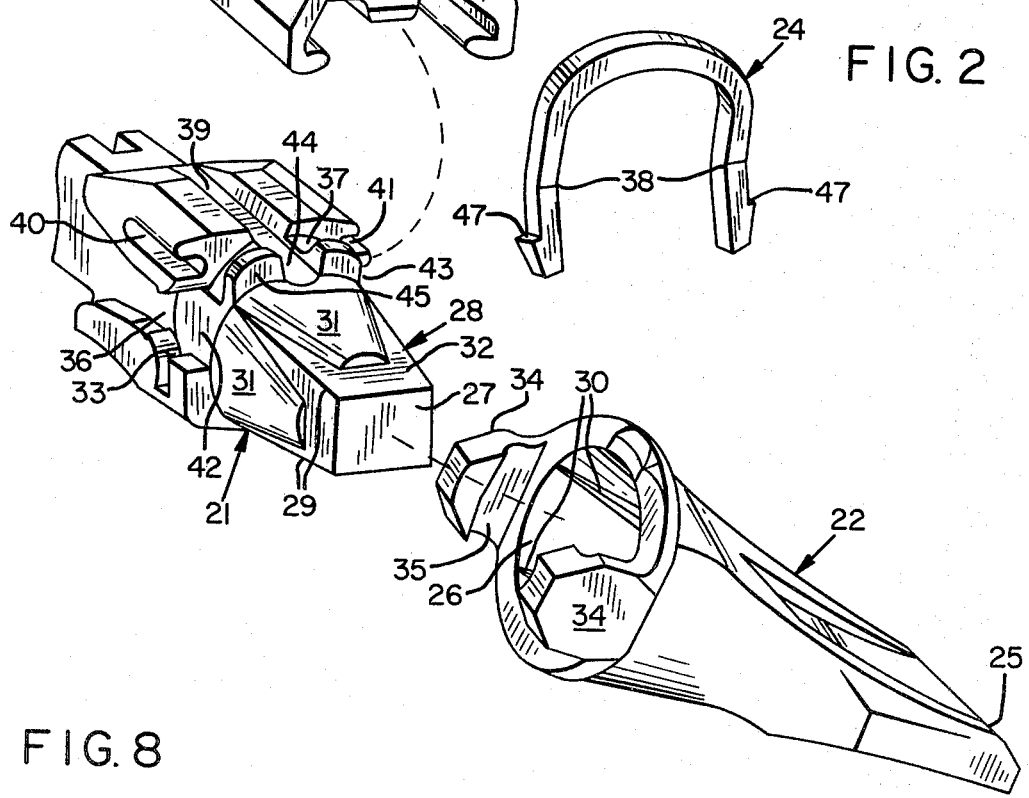
FIG. 8
FIG. 9
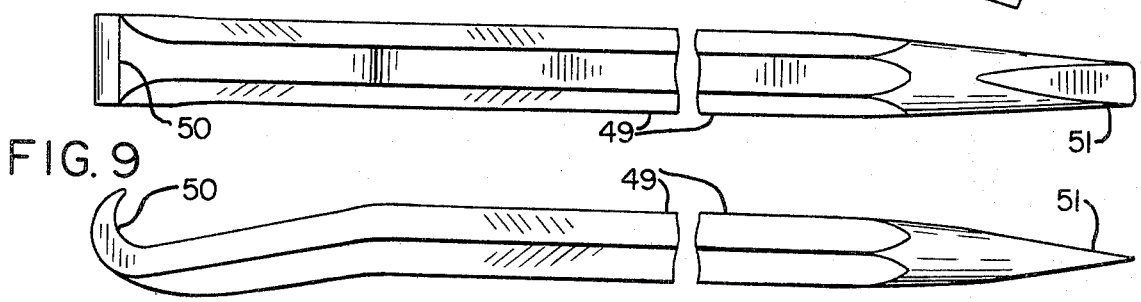

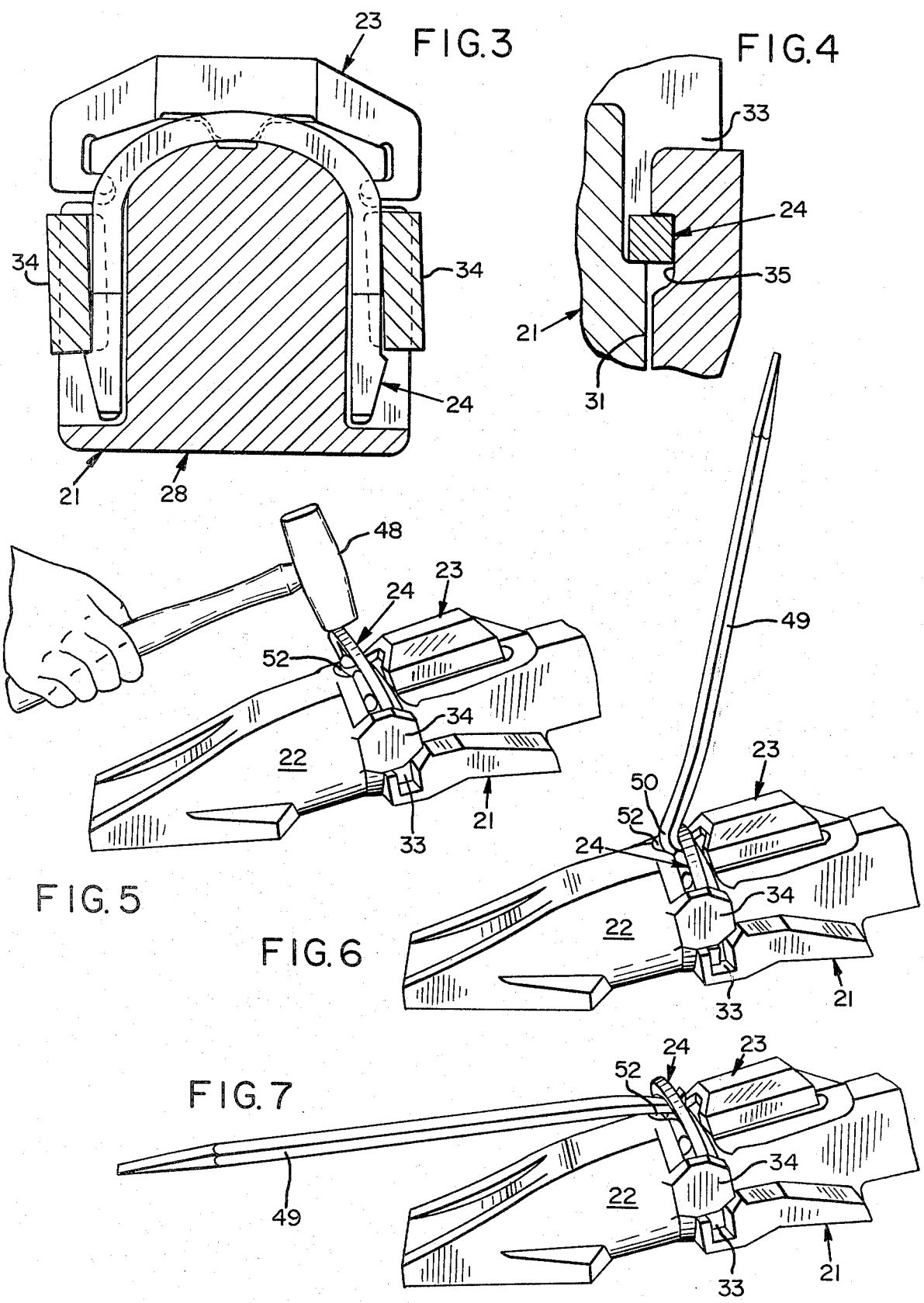

EXCAVATING TOOTH

This invention is a continuation-in-part of our copending application Ser. No. 144,368, filed Apr. 28, 1980 now abandoned and Ser. No. 235,771 filed Feb. 25, 1981 now U.S. Pat. No. 4,335,532.

BACKGROUND AND SUMMARY OF INVENTION

This invention relates to an excavating tooth and, more particularly, to an excavating tooth having a unique connection between the point and adapter. As such, the invention relates to two-part teeth. At about the turn of the century, workers in the excavating art saw the merit of providing replaceable tips, viz., "points" on the tooth shank or adapter, so as to renew the penetrating portion without expensive downtime—see, for example, U.S. Pat. No. 564,664.

A conventional way of temporarily locking the point on the adapter was to use a pin lock extending through aligned openings in the point and adapter nose.

According to the instant invention, a significant improvement has been made in the excavating tooth art by the use of a lock external to the coupling. An immediate advantage accuring from this arrangement is that the adapter nose can be solid, i.e., the heretofore commonplace locking pin opening is eliminated. It is in the area of the pin opening that most nose failures occur—so that art workers have had to "beef-up" this portion of the nose. Normally, the lock opening is positioned near the shoulder which joins the nose to the relatively massive adapter shank so that this has been an additional concern—providing an area of weakness immediately adjacent an area of transition, classically an area of incipient failure in itself. However, the wedge or tapered shape of the nose—dictated by the need for easy assembly and proper performance—also dictated that the pin opening be as rearward as possible so as to be in the section of greatest area, hence, strength. But, as pointed out just above, this intruded on the classically weak area of transition and aggravated the weakness.

However, by utilizing a solid nose as the coupling means with the lock external thereto, the adapter is strengthened to such an extent that, according to the preliminary tests, the rupture resistance of the nose in the inventive tooth is that of a conventional tooth one or two sizes larger, i.e., 20% stronger than the comparable prior art tooth of the same size. For example, teeth are generally sized according to the horizontal dimension across the rear of the point, expressed in inches—so the inventive tooth has the strength of a conventional tooth $\frac{1}{2}"-2"$ wider.

The provision of the external lock provides a second and equally desirable advantage—the shear forces normally applied to the locking pin are converted to compressive forces so that a much smaller pin is used, again resulting in better use of the available metal in the tooth. It will be appreciated that in past teeth an impact tending to remove the point resulted in shearing forces at the ends of the centrally-located locking pin. In other words, the movement of the inside of the point relative to the outside of the nose tended to shear the pin in the plane of movement. However, with the inventive arrangement, any movement of the point in a twisting, sideways or up and down fashion applies the nominally shearing forces at points where the locking pin is bolstered against a portion of the adapter—so that what ordinarily would be a shearing force is converted to a compressive force. Thus, the force that in conventional teeth would tend to transversely sever the metal now tends to elongate the same—against which the metal has much greater resistance. It should be appreciated that the unseating forces come from all angles and therefore normally have a sideways component.

Historically, locking pins have extended vertically through the point and adapter nose so as to facilitate disassembly. Horizontal pins have been used but have uniformly been considered "knuckle-busters" because of the difficulty of access. This impedes one principal function of the lock—to be easily removable so as to permit quick replacement of the point. The other principal function is, of course, to keep the point firmly mounted on the adapter against inadvertent removal.

The invention achieves the beneficial results of the vertical pin locks of the past by using rearwardly extending tongues on the point sides to provide the means adapted to receiving vertical pins—so that at the same time the lock is not only lateral and rearward of the coupling section but also able to receive a vertical pin. Even further, the provision of the tongues reduces further the stress to be resisted—by at least $\frac{1}{2}$—because two locks are available without sacrificing valuable wear metal.

Although rearwardly extending tongues on points have long been used—see U.S. Pat. No. 2,483,032—they have not been used so far as is known to the inventors hereof for locking, rather only for secondary stabilization. In fact, the only disclosures known to the inventors hereof using an external lock are U.S. Pat. No. 2,666,272 and German Pat. No. 390,476. These, and co-owned U.S. Pat. No. 3,496,658, none of which was employed commercially so far as known, are the only teachings where the aligned vertical lock openings were eliminated from the nose and point.

In the preferred form of the invention, an inverted U-shaped locking pin is employed which straddles the adapter and engages slots in the rearwardly extending tongues—thereby simultaneously achieving greater nose strength and the advantageous vertical removal. Additionally, the bight portion of the U-shaped pin is received within a transverse recess in the adapter top to protect the pin while providing means for such removal—and also while being located in the massive section of the adapter so as not to intrude into the areas of potential failure described above.

In the instance where a heavy impact load is concentrated near the tip of the tooth, it is advantageous to provide additional means for secondary stabilization generally following the principle of U.S. Pat. No. 3,079,710. The structures used previously to provide such stabilization, viz., "flats" on the nose and socked have been made much more useful per se in the inventive tooth. This has been achieved through extending nearly square-sided rails out to the tip of the nose of the adapter and apex of the point socket while positioning them at the corners of the nose and socket apices.

These terminal portions of the rail means have been found to be advantageous cooperating with the "flate" of the stabilized nose and socket to prevent "peeling" of the point from the adapter upon the application of concentrated impact loads by developing more stabilized bearing surfaces all the way along the length of the nose and socket.

In the preferred embodiment the rib or rail means are nearly square-sided and non-uniform in cross-section along their length—being larger adjacent the nose or socket tips or apices as they are nearly circumscribable (less draft) inside a cylinder but are reduced in size toward the rear due to inscribed conical nose in the illustrated embodiment.

Other advantages, both general and specific, of the invention can be appreciated as this specification procees.

The invention is described in conjunction with the accompanying drawing, in which FIG. 1 is a side elevational view of a tooth embodying teachings of the instant invention; and FIG. 2 is a perspective view in exploded form of the tooth of FIG. 1;

FIG. 3 is a fragmentary sectional view showing the radial compressive force on the locking pin as along line 3—3;

FIG. 4 is a sectional view taken along the line 4—4 of FIG. 1;

FIG. 5 is a perspective view of the tooth in the process of assembly;

FIG. 6 is another perspective view showing the use of a special tool in disassembly of the tooth; and FIG. 7 is yet another perspective view showing a subsequent step in disassembly of the tooth.

In the illustration given, the numeral 20 designates generally the inventive tooth assembly. As best seen in FIG. 2, the numeral 21 designates an adapter element while the numeral 22 designates the point element—the adapter 21 being seen only in fragmentary form inasmuch as a shank is usually provided for mounting the adapter onto the bucket lip, etc. Completing the combination are a wear cap 23 (optional) and a lock 24 in the form of an inverted U-shaped rod.

The point 22 has a digging or earth engaging edge or bit 25 at one end thereof and coupling means consisting of a socket 26 extending forwardly from the mounting end thereof. The adapter 21, in the illustration given, is equipped with a forwardly projecting nose part 27 which is adapted to be received within the socket 26. The point is installed on the adapter by a lineal movement along the longitudinal center line or axis of the tooth.

In some instances, the nose and socket may be reversed—as where the mounting end of the point 22 is equipped with a shank very much like the nose 27 and the adapter is equipped with a socket much like the socket 26 and the point 22. However, the point is the element usually equipped with the socket because this is the element thrown away when worn or dull and it is advantageous to construction people, contractors, etc., to minimize the amount of throwaway metal.

The illustrated embodiment of the invention employs straight rail means generally designated 28 for achieving the initial coupling between the point 22 and adapter 21. In the illustration given, the rails 29 are provided on the adapter nose 27 while the mating grooves 30 (see particularly FIG. 2) are provided on the interior of the socket 26. More particularly, a plurality of rail or groove means (four or six to permit reversability) are provided in circumferentially-spaced relation about the nose 27 and in the socket 26. The major portion of the nose optimally is a surface of revolution generated about the longitudinal axis and thus may be conical as by generating the same by revolving a straight line inclined to the longitudinal axis or revolving another curve such as a parabola so as to develop optimum beam strength. However, the nose portion between rails may also be a frustum of a pyramid.

It will be appreciated that the male and female components of the rail means, i.e., the rails 29 and grooves 30 may be interchanged between the nose and socket. However, as pointed out previously, the point is normally thrown away—the average life of an adapter being about that of five points—so that it is advantageous to minimize the metal in the point and therefore install the grooves therein.

The numeral 31 (see FIGS. 1 and 2) designates the surfaces of revolution between the rails 29. At the forward end of the nose 27 as at 32 an area or section of stabilization is provided—generally as in U.S. Pat. No. 3,079,710.

In the operation of the illustrated form of the invention, the adapter is positioned with the forward end of the nose rails 29 in alignment with the rear end of the point grooves 30 and installment is achieved by moving the point 22 rearwardly. Thereafter the generally U-shaped lock 24 is insertable into the two side vertical locking slots 33. The lock 24 engages tongues or ears 34 extending rearwardly of the point 22 and having slots 35 therein. The tongues 34 extend into mating recesses 36 in the adapter. The tongues 34 on the point 22 enter the recesses 36 at the last stage of point mounting.

It can be seen that the lock 24 holds the wear-cap 23 on as well as the point 22. It is only necessary to mount the wear cap 34 and point 22 on the adapter 21 before the lock 24 is installed.

The inverted U-shaped lock 24 is now installed—in the fashion depicted in FIG. 5. For this purpose, a transverse recess 37 is provided in the upper surface of the adapter. The lock 24 is held in place by slight deformation of the leg portions as at 38.

The upper surface of the adapter may be longitudinally slotted as at 39 for receipt of the central dovetail of the wear cap 23—while the adapter sides are slotted as at 40 and 41 to receive the rails or side flanges of the wear cap. The integral ring-like wall 45 (see FIGS. 1 and 2) just forward of the recess 37 is notched as at 42, 43 and 44 to accommodate passage of the side flanges and central dovetail, respectively of the wear cap 23. When the U-shaped lock 24 is installed, it bears against the forward end of projection of the wear cap 23 as at 46 to lock the same in place. Thus, te lock 24 not only temporarily locks the point 22 on the adapter 21 but also performs the same function relative to the wear cap 23.

The lock 24 is constructed of resilient steel and because the legs are angled or deformed, some force is required to install the same in the transverse recess 37 and through the slots 35 in the tongues 34. This aids in keeping the point tight on the nose. Additionally, the legs may be notched as at 47 to engage the undersides of the tongues 34 (see FIG. 1). To apply this force, no special tool is required—only a hammer as at 48 in FIG. 5 is used.

Once the lock 24 is driven substantially downward towards its seated position, the sides of the lock bow inwardly until the notches 47 snap in place under the tongues 34. For removal a hook-shaped tool 49—see FIGS. 6–9 is employed. The tool 49 has a hook end as at 50 useful in prying out the U-shaped lock 24 in the fashion depiected in FIGS. 6 and 7, further assisting the quick changing feature. The pick or blade end 51 is useful in cleaning out the insert area 52 (see FIG. 5) and also can be used to loosen a point which is jammed onto the adapter—even after the lock 24 has been removed.

While the deformed lock provides tightness, an optional method to achieve a tight fit between the point and adapter includes an annular groove 53 provided at the apex of the socket 26 and an O-ring 54 of resilient material is installed therein. The provision of the annular groove 53 provides an advantageous function during manufacture because it constitutes a repository for the difficult-to-remove sand that normally occludes to casting corners. Thus, the adhering sand—on which considerable time has been spent in the past in removal—now can be substantially ignored and the groove later on serves as a place for inserting the O-ring 54.

An alternative means for tightening the point on the adapter is to taper the legs of the U-shaped lock 24 as by forming them with a diminishing cross-section in proceeding downwardly—thereby developing a wedging action on installation.

In the operation of the invention, there is a unique operation of the external lock—one, for example, not achievable in the prior art U.S. Pat. No. 2,145,663. There the pin lock was located on the longitudinal centerline—so there was the disadvantage of weakening the nose near the critical shoulder area. Additionally, any point-unseating force—say a vertical force from above—tended to move the upper surface of the rearwardly extending nose forwardly while the lower surface moved rearwardly, creating the undesirable shearing action on the pin. This meant that if such a construction were used commercially, the pin would have to be enthickened so as to resist the shear—thereby requiring a larger nose opening and as a consequence further weakening the nose.

The inventive lock by virtue of being lateral of the longitudinal centerline results in the pin being subjected to compression and shear in certain instances. In other words, the forces that normally would be applied in transverse shear and bending now are applied in a form of compression (see FIG. 3) but in other cases, depending upon the direction of magnitude of the applied force may be in longitudinal shear. The difference of a rod or pin in resisting these to different types of forces can be graphically illustrated by first putting a pendil on the edge of a table with a portion projecting beyond the table in cantilever fashion. It does not take a strong downward force on the overhanging end od the pencil to snap it off, i.e., from transverse shear. On the other hand, placing the pencil wholly on the table and subjecting it to the same downward force or in a longitudinal direction does nothing. In fact, a substantially gerater force is needed to crush the pencil, i.e., to cause the fibers of the pencil to move longitudinally away from each side of the point of force application.

The conversion of the forces from acting in transverse shear and bending to those acting in compression is realized through the provision of the external lock. As the point is rotated or twisted under a force having a lateral component, the tongues 34 move from their essentially vertical orientation to one that is inclined to the vertical—see FIG. 3. This results in the force near the bottom of one tongue 34 accompanied by the complementary force being applied near the top of the other tongue 34.

Any negative thrust on the point moves the tongue 34 forwardly. This moves the lock 24 from its preloaded but generally low stressed condition to a condition where the deformed portion 38 is under a compressive stress—tending to straighten it out. So, again, what would have been a destructive transverse shear force is converted to a relatively benign longitudinal compressive force. The external lock thus provides an entirely different phenomenon or coaction so that the lock thickness can be substantially reduced—and in the place the larger prior art pins occupied more tooth metal can be installed.

The provision of the external lock and the stabilizing section makes possible a variety of ways of resisting a force tending to remove the point from the adapter. First, it should be appreciated that there is great variability in the direction, location and magnitude of such forces. Second, there is great variability in the "fit" between the various parts. The point and adapter, being a manufactured product have tolerances—that even a subsequent point on the same adapter may fit completely differently.

According to the illustrated embodiment, there are three ways in which a point unseating force can be resisted and, according to preliminary testing, these generally occur in combination. First, the fit and external force vectors can result in twisting of the point resisted primarily by subjecting the pin to compression—as in FIG. 3. Second, the fit and force may cause the preloaded lock to operate within its preload—to enter the space S forward of the lock in FIG. 1—so that the stabilizing section 32 can provide the resistance. Third the fit and force may subject the lock to longitudinal shear. Although this type of resistance is known as in U.S. Pat. No. 3,774,324, for example, it was never modified or limited by the use of stabilizing means.

Especially advantageous in resisting this type of loading is the combination of the rails and the stabilizing surfaces. Because the rails are inscribed within a cylinder (save for the 2° draft required for pattern removal), there is a constant pitch diameter for the rails. Because the rails are circumscribed on the surfaces of revolution, i.e., the cone surfaces 31, there is a reduction in the rail projection or depth of groove as one proceeds rearwardly. This results in a concentration of the rail mass at the nose apex. The greater amount of exposed rail at the apex results under impact in a clinching action akin to that of a lock nut.

We claim:

1. An excavating tooth comprising an adapter element and a point element, said adapter element having means at one end for connection to a bucket or the like and a nose at the other end for coupling to said point element, said point element having an earth engaging edge at one end constituting the tooth forward end and a socket at the other end for coupling to said adapter element, said nose and socket being equipped with straight, longitudinally extending rail and groove means, and lock means externally of said nose releasably connecting said elements to prevent inadvertent disassembly of said elements, said lock means including rearwardly extending tongues on said point element and recesses on said adapter element, and rod means interposed between said tongues and recesses.

2. The structure of claim 1 in which said rod means is a generally U-shaped fastener having legs depending from a connecting bight.

3. The structure of claim 2 in which said adapter element is equipped with a transverse recess rearward of said nose for accommodating said bight of said U-shaped fastener.

4. The structure of claim 1 in which said nose and socket are each equipped in the apices thereof with generally planar bearing surfaces arranged generally perpendicular to the beam component of a force applied to said point element.

5. The structure of claim 4 in which said cooperating means extend into said apices and adjacent cooperating means flank each bearing surface.

6. The structure of claim 5 in which said cooperating means are non-uniform in transverse section in proceeding rearwardly therealong.

7. The structure of claim 6 in which said nose and socket are equipped with apices having a general polygonal shape in transverse section to define a plurality of intersecting corners, said cooperating means extending generally along said corners.

8. The structure of claim 7 in which said apices are equipped with surfaces between said corners which merge into said rail means.

9. The structure of claim 7 in which said nose and socket rearward of said apices includes a surface of revolution generated about said axis, said surface of revolution extending from about 60% to 85% of the length of said nose and socket.

10. A coupling for mounting an excavating tooth comprising a nose-equipped element and a socket-equipped element with the nose of the first mentioned element being received in the socket of the second mentioned element, lock means external of said nose releasably connecting said elements to prevent inadvertent disassembly of said elements, said lock means including tongues on one element and recesses on the other, and rod means interposed between said tongues and recesses, said nose and socket each being equipped in the apices thereof with generally planar bearing surfaces arranged generally perpendicular to the beam component of a force applied to said point element, said nose and socket being equipped with cooperating, longitudinally extending rail and groove means flanking each bearing surface.

11. The structure of claim 10 in which said nose-equipped element is equipped with said recesses.

12. An excavating tooth comprising an adapter element and a point element, said adapter element having means at one end for connection to a bucket or the like and a nose at the other end for coupling to said point element, said point element having an earth engaging edge at one end constituting the tooth forward end and a socket at the other end for coupling to said adapter element, lock means externally of said nose releasably connecting said elements to prevent inadvertent disassembly thereof, and a wear cap removably mounted on said adapter element, said lock means being operative to maintain said wear cap in place on said adapter element.

13. An excavating tooth comprising an adapter having a nose at one end and means at the other end for mounting on a bucket or the like, said adapter being equipped with means for slidably receiving a wear cap, a point having a socket mounted on said adapter nose, said point and adapter being equipped with tongues and recesses external of said nose for coupling the point and adapter together, and a generally U-shaped lock extending through said tongues and recesses for maintaining said point and adapter in releasably locked condition while also maintaining said wear cap in position on said adapter.

14. The structure of claim 16 in which said recesses extend toward said adapter other end and are open thereat to accommodate receipt of a portion of a bucket lip.

15. A tooth point comprising a unitary metal element having a socket at one end and a digging edge at the other end, said socket including a plurality of straight longitudinally extending groove means and said point laterally and longitudinally rearwardly of said socket being equipped with tongue means for coupling to an adapter, said tongue means being arranged and constructed to receive locking rod means, said socket being equipped with an apex having a generally rectangular shape in transverse section to define a plurality of intersecting corners, said groove means extending generally along said corners.

16. In an excavating tooth having an adapter element and a point element, said adapter element having means at the rear end for connection to a bucket or the like and a forwardly extending nose at the front end for coupling to said point element, said point element having an earth engaging edge at the forward end and a socket at the rear end for receiving said adapter element nose, lock means rearward of said nose releasably connecting said elements to prevent inadvertent disassembly of said elements, said lock means including rearwardly tongues on said point element and recesses on the adapter element, and rod means interposed between said tongues and recesses, the improvement characterized by said socket and nose being equipped at the apices thereof with a plurality of spaced apart, straight, longitudinally extending cooperating rail and groove means for stabilizing said point element on said adapter element.

17. A tooth point comprising a unitary metal element having top, bottom and side walls, said top and bottom walls converging toward one end of said element to provide a forward digging edge, said walls at the other end of said point terminating generally conterminously to define a rear wall, a socket in said rear wall extending fowardling therefrom, a tongue integral with each side wall, and extending rearwardly from said rear wall, each tongue being arranged and constructed to receive locking rod means, said socket, including a plurality of straight forwardly extending groove means and terminating adjacent the apex of said socket.

18. A tooth point comprising a generally elongated unitary metal element and adapted to be mounted on an elongated adapter nose by movement only longitudinally of said nose, said element having a rear wall at one end and a forward digging edge at the other end, a socket extending forwardly from said rear wall for receiving said nose, a plurality of straight, forwardly extending groove means in said socket terminating adjacent the socket apex, relatively elongated tongue means extending rearwardly from said rear wall, and slot means in said tongue means extending transversely to the length thereof for the receipt of locking rod means.

* * * * *